US009740972B2

(12) United States Patent
Mashiko

(10) Patent No.: US 9,740,972 B2
(45) Date of Patent: Aug. 22, 2017

(54) PREVENTING LOSS OF PRINT JOB INFORMATION IN A RESTART OPERATION OF A PRINT ENGINE

(71) Applicant: Yohta Mashiko, Kanagawa (JP)

(72) Inventor: Yohta Mashiko, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/071,158

(22) Filed: Mar. 15, 2016

(65) Prior Publication Data
US 2016/0274823 A1    Sep. 22, 2016

(30) Foreign Application Priority Data
Mar. 20, 2015   (JP) ................................. 2015-058766

(51) Int. Cl.
*G06F 3/12*   (2006.01)
*G06K 15/00*  (2006.01)

(52) U.S. Cl.
CPC ....... *G06K 15/4055* (2013.01); *G06K 15/408* (2013.01); *G06K 15/409* (2013.01)

(58) Field of Classification Search
None
See application file for complete search history.

(56) References Cited

U.S. PATENT DOCUMENTS

| 2005/0179931 A1* | 8/2005 | Yamaguchi | G06F 11/0733 358/1.14 |
| 2011/0210618 A1* | 9/2011 | Takasu | H04W 76/023 307/104 |
| 2013/0321849 A1* | 12/2013 | Masui | G06K 15/1809 358/1.14 |

FOREIGN PATENT DOCUMENTS

| JP | 11-277854 | 10/1999 |
| JP | 2005-219247 | 8/2005 |

* cited by examiner

*Primary Examiner* — Andrew H Lam
(74) *Attorney, Agent, or Firm* — Duft Bornsen & Fettig LLP

(57) ABSTRACT

A control apparatus includes an execution controller, a stop controller, a connection processing unit, a print job information holding unit, a resumption controller, and a power supply controller. The execution controller causes an image forming unit to execute a print job. When the restart of the image forming unit is detected, the stop controller causes the image forming unit to stop the print job currently in process. When the completion of restart of the image forming unit is detected, the connection processing unit connects the control apparatus and the image forming unit. After the connection, the resumption controller resumes execution of the print job being stopped by the stop controller based on the print job information held by the print job information holding unit. The power supply controller supplies power to the print job information holding unit even if a failure requiring a restart of the image forming unit occurs.

7 Claims, 7 Drawing Sheets

FIG.4

| PRINT JOB ID | PROCESS ID | IMAGE ID |
|---|---|---|
| 00001 | AAAA1 | BBBB1 |
| | AAAA2 | BBBB2 |
| | AAA3 | BBBB3 |
| ⋮ | ⋮ | |

PREVENTING LOSS OF PRINT JOB INFORMATION IN A RESTART OPERATION OF A PRINT ENGINE

CROSS-REFERENCE TO RELATED APPLICATION(S)

The present application claims priority to and incorporates by reference the entire contents of Japanese Patent Application No. 2015-058766 filed in Japan on Mar. 20, 2015.

BACKGROUND OF THE INVENTION

1. Field of the Invention

The present invention relates to a control apparatus, a control method, and a computer program product.

2. Description of the Related Art

A technique for automatically resuming a print job if the print job is stopped due to a failure and then the failure is recovered has been known.

For example, Japanese Laid-open Patent Publication No. 11-277854 discloses a technique for suspending transmission of a print job when a failure occurs, and resuming transmitting the print job after a recovery from the failure.

According to the technique disclosed in Japanese Laid-open Patent Publication No. 11-277854, if reboot processing (restart processing) is performed to recover from the occurred failure, power supply to a print control apparatus is also stopped. This also clears the state that the print job is in process. The print processing then needs to be repeated from a print job start request again, and the suspended print job is not able to be resumed.

SUMMARY OF THE INVENTION

It is an object of the present invention to at least partially solve the problems in the conventional technology.

A control apparatus for controlling an image forming unit that forms an image on a recording medium includes an execution controller, a first detector, a stop controller, a second detector, a connection processing unit, a print job information holding unit, a resumption controller, and a power supply controller. The execution controller performs control to cause the image forming unit to execute a print job. The first detector detects a restart of the image forming unit. When the restart of the image forming unit is detected by the first detector, the stop controller performs control to cause the image forming unit to stop the print job currently in process. The second detector detects completion of the restart of the image forming unit. When the completion of the restart of the image forming unit is detected by the second detector, the connection processing unit performs a process for connecting the control apparatus and the image forming unit. The print job information holding unit holds print job information used to know an execution status of the print job. After the control apparatus and the image forming unit are connected by the connection processing unit, the resumption controller performs control to resume execution of the print job that has been stopped by the stop controller based on the print job information. The power supply controller performs control to supply power to at least the print job information holding unit even if a failure that needs a restart of the image forming unit occurs.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of print job information according to the embodiment;

DETAILED DESCRIPTION OF THE PREFERRED EMBODIMENTS

An embodiment of a control apparatus, an image forming apparatus, a control method, and a program according to the present invention will be described in detail below with reference to the accompanying drawings.

Figure 1:
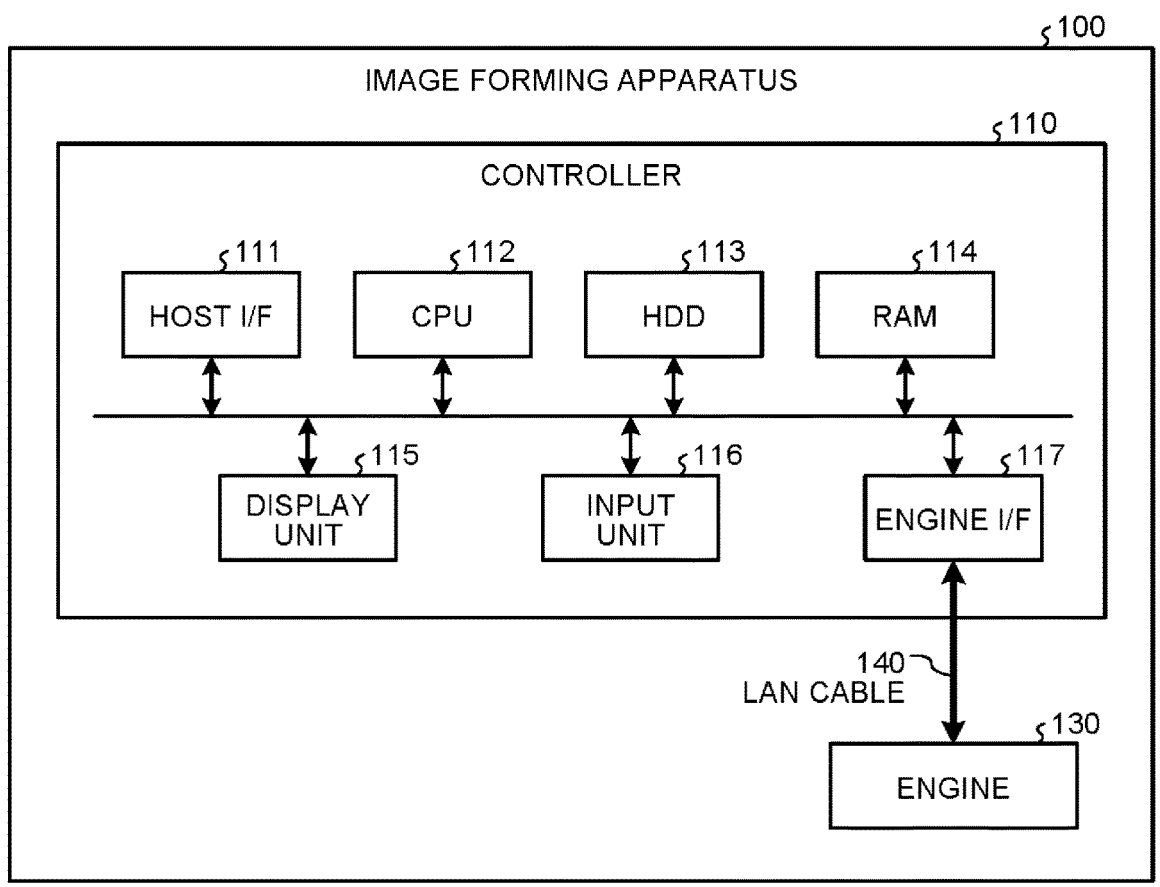
FIG. 1 is a diagram illustrating an example of a hardware configuration of an image forming apparatus according to an embodiment.

FIG. 1 is a diagram illustrating a hardware configuration of an image forming apparatus 100 according to the present embodiment. For example, the image forming apparatus 100 may be configured as a multifunction peripheral (MFP). An MFP refers to an apparatus that has a plurality of different functions such as a copy function, a scanner function, a print function, and a facsimile function.

As illustrated in FIG. 1, the image forming apparatus 100 includes an engine (an example of an image forming unit) 130 which forms an image on a recording medium (such as a sheet), and a controller (an example of a controller or control apparatus) 110 which controls the engine.

As illustrated in FIG. 1, the controller 110 includes a host I/F 111, a CPU 112, a HDD 113, a RAM 114, a display unit 115, an input unit 116, and an engine I/F 117.

The host I/F 111 is an interface for connecting to a host apparatus such as an external personal computer (PC). The CPU 112 controls an operation of the entire image forming apparatus 100 in a centralized manner. The HDD 113 stores various programs for the CPU 112 to execute and various types of data such as a screen image to be displayed on the display unit 115. The RAM 114 is a volatile memory used as a work area for image processing. The display unit 115 displays various images. The input unit 116 accepts various inputs. The engine I/F 117 is an interface for connecting to the engine 130. In this example, the engine 130 is connected with the controller 110 via a LAN cable 140. The engine 130 and the controller 110 have respective independent power supplies.

Figure 2:
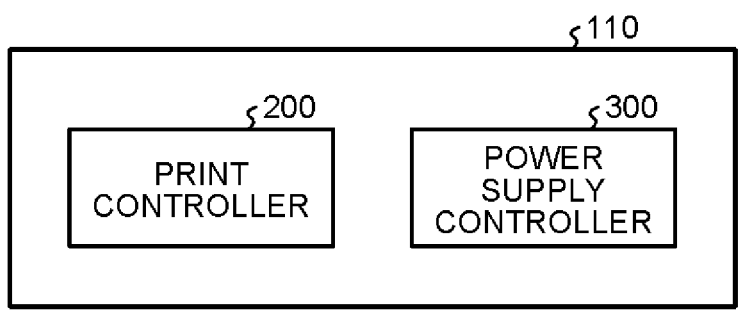
FIG. 2 is a diagram illustrating an example of functions of a controller according to the embodiment.

FIG. 2 is a block diagram illustrating an example of functions of the controller 110. For convenience of description, in the example of FIG. 2, functions related to the present invention are mostly illustrated. However, the functions of the controller 110 are not limited thereto.

As illustrated in FIG. 2, the controller 110 includes a print controller 200 and a power supply controller 300.

The print controller 200 performs control related to print processing (an example of image formation processing for forming an image on a recording medium) of the engine 130, and manages print setting information. Further details will be described later.

The power supply controller 300 controls power supply to the controller 110. In the present embodiment, the power supply controller 300 performs control to supply power to the controller 110 (control for continuing the power supply to the controller 110) even if a failure that needs a restart of the engine 130 occurs. In this example, the engine 130 has a function for detecting the occurrence of a failure. If the engine 130 detects the occurrence of a failure, the engine 130 can notify the controller 110 (power supply controller 300) of the occurrence of the failure.

In the present embodiment, the functions of various units of the controller 110 (print controller 200 and power supply controller 300) are implemented by the CPU 112 reading a program stored in the HDD 113 or the like into the RAM 114 and executing the program. However, this is not restrictive. For example, at least part of the functions of the units of the controller 110 may be implemented by a dedicated hardware circuit (such as a semiconductor integrated circuit).

Figure 3:
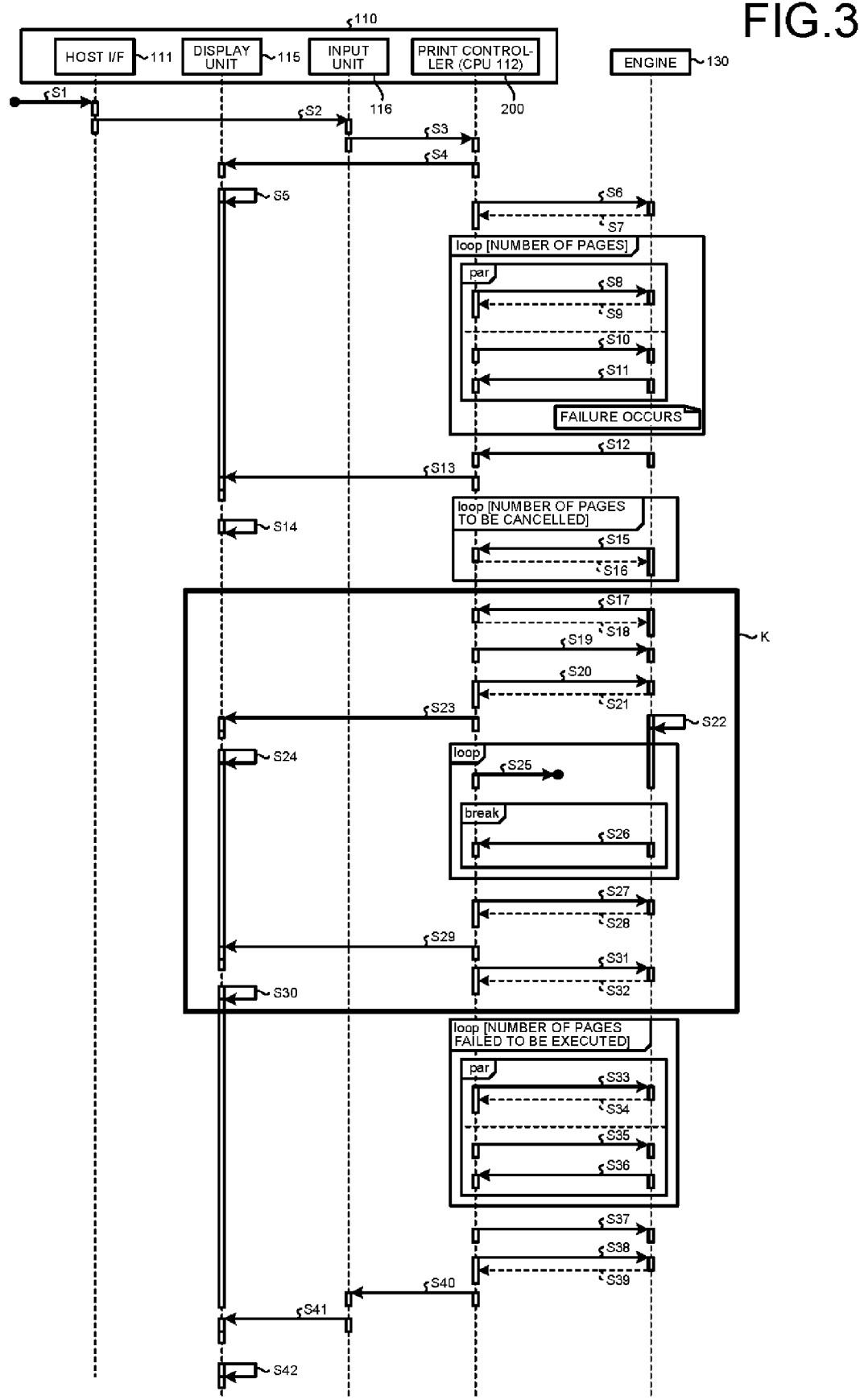
FIG. 3 is a diagram for describing an example of a processing flow of the image forming apparatus according to the embodiment.

FIG. 3 is a diagram for describing an example of a processing flow of the image forming apparatus 100 according to the present embodiment. As illustrated in FIG. 3, the host I/F 111 of the controller 110 accepts a print request including image data to be printed from the host apparatus (step S1). In this example, the image data included in the print request is expressed in a vector format. The print request accepted by the host I/F 111 is input to the print controller 200 (CPU 112) via the input unit 116 (steps S2 and S3).

Receiving the print request, the print controller 200 requests the display unit 115 to display information indicating that a print job is in process (step S4). Receiving the request, the display unit 115 displays the information indicating that the print job is in process (step S5).

Next, the print controller 200 performs control to cause the engine 130 to execute the print job. The details will be described below. The print controller 200 initially instructs the engine 130 to start the print job. In this example, the print controller 200 transmits a print start request command requesting the start of printing to the engine 130 (step S6). As a response, the print controller 200 receives a print start response command from the engine 130 (step S7). In this example, the print start response command includes a print start request acceptance result indicating whether the print start request has been accepted.

When the print start request acceptance request indicates that the print start request has been accepted, the print controller 200 assigns a print job ID (an example of print job identification information) for identifying the print job to the print job for the engine 130 to execute. The print controller 200 converts the image data expressed in the vector format, included in the print request accepted from the host apparatus, into image data expressed in a raster format, thereby generating image data targeted for the print job. Then, for each page of the image data targeted for the print job, the print controller 200 requests the engine 130 to execute printing based on the image data (in the following description, the printing based on one page of image data may be referred to as a "process"), and transmits the image data.

In this example, for each page of the image data targeted for the print job, the print controller 200 transmits a process execution request command for requesting the execution of the process corresponding to the image data to the engine 130 (step S8). The print controller 200 transmits an image transfer command including the image data to the engine 130 (step S10). In this example, the process execution request command includes the print job ID, a process ID (an example of process identification information) for identifying the process, and an image ID for identifying the image data to be printed. The image transfer command includes the image ID and the image data to be printed (one page of image data expressed in a raster format). In this example, the print controller 200 receives a process execution response command from the engine 130 as a response to the process execution command (step S9). The process execution response command includes the print job ID specified by the process execution command, the process ID specified by the process execution command, and a process execution request acceptance request indicating whether the process execution request has been accepted.

Each time the engine 130 completes the execution of the execution-instructed process (each time the steps up to paper ejection are completed), the engine 130 notifies the print controller 200 of process completion information which makes a notification of the completion of the process. In this example, each time the execution of the accepted process is completed, the engine 130 transmits a process state command (an example of the process completion information) to the print controller 200 (step S11). The process state command includes the print job ID, the process ID, and paper ejection completion information indicating that the steps up to paper ejection are completed.

In the present embodiment, the print controller 200 manages (holds) print job information used to know the execution status of a print job (or print jobs). FIG. 4 is a diagram illustrating an example of the print job information in the present embodiment. In the example of FIG. 4, the print job information is information in which each print job ID is associated with process IDs and image IDs. Each time the print controller 200 receives a process state command from the engine 130, the print controller 200 identifies, in the print job information, a print job ID that matches the print job ID included in the received process state command. The print controller 200 deletes a process ID that matches the process ID included in the received process state command among the process IDs associated with the identified print job ID, and deletes the image ID associated with the process ID to update the print job information. For example, suppose that the print job ID included in the process state command received from the engine 130 is "00001" and the process ID is "AAAA1." In such a case, the print controller 200 deletes the process ID "AAAA1" and the image ID "BBBB1" associated with the print job ID "00001" from the print job information illustrated in FIG. 4 to update the print job information.

If a failure occurs during the foregoing step S8 or S10, the engine 130 notifies the print controller 200 of an error. In this example, the engine 130 transmits an engine state notification command including an error code to the print controller 200 (step S12). The error code is a number for identifying the error. Receiving the engine state notification command, the print controller 200 requests the display unit 115 to display information indicating the occurrence of the error (step S13). Receiving the request, the display unit 115 displays the information indicating the occurrence of the error (step S14).

The engine 130 also makes a notification of a process(es) of which execution will be cancelled due to the occurrence of the failure among the processes already instructed to be executed. In this example, the engine 130 transmits a process cancel request command to the print controller 200 (step S15) as many as the page(s) to be cancelled. As a response, the engine 130 receives a process cancel response command from the print controller 200 (step S16). The process cancel request command includes the print job ID and the process ID for identifying the process to be cancelled. The process cancel response command includes a process cancel request acceptance result which is information indicating whether the process cancel request has been accepted.

In the present embodiment, if the occurred failure is one recoverable by rebooting, the engine 130 automatically executes a reboot. In such a case, the engine 130 notifies the print controller 200 of the execution of the reboot. In this example, the engine 130 transmits a controller registration cancellation command to the print controller 200 (step S17). As a response, the engine 130 receives a controller registration cancellation response command from the print controller 200 (step S18). The controller registration cancellation command is a command for making a notification of the cancellation of the connection with the controller 110, and includes a cancellation type indicating a cancellation factor. Possible cancellation factors include a reboot and a shutdown. Here, the cancellation type indicating a reboot is included in the controller registration cancellation command. As described above, in the present embodiment, the power supply controller 300 performs control to supply power to the controller 110 even if the engine 130 executes a reboot (a failure recoverable by a reboot occurs).

Receiving the notification of the reboot from the engine 130, the print controller 200 notifies the engine 130 of an end of issuance of processes to temporarily end the print job even if all the processes have not been issued (all the processes have not been instructed to be executed). In this example, the print controller 200 transmits a process issuance end command to the engine 130 (step S19). The process issuance end command includes the print job ID for identifying the print job of which to end the issuance of processes. The print controller 200 then instructs the engine 130 to end the print job. In this example, the print controller 200 transmits a print end request command to the engine 130 (step S20). As a response, the print controller 200 receives a print end response command from the engine 130 (step S21). The print end request command includes the print job ID for identifying the print job to end printing. The print end response command includes a print end request acceptance result indicating whether the print end request has been accepted.

The engine 130 then performs the reboot (step S22). The print controller 200 requests the display unit 115 to display information indicating that the engine 130 is in process of restarting (step S23). Receiving the request, the display unit 115 displays the information indicating that the engine 130 is in process of restarting (step S24).

Subsequently, the print controller 200 transmits a ping at regular intervals (step S25). If a response to the ping is received (step S26), the print controller 200 detects that the restart of the engine 130 is completed. The print controller 200 then executes a connection process with the engine 130. In this example, the print controller 200 transmits an engine connection request command to the engine 130 (step S27). As a response, the print controller 200 receives an engine connection response command (step S28). The engine connection request command includes configuration information about the controller 110. The engine connection response command includes an engine connection request acceptance result indicating whether the engine connection request has been accepted, and configuration information about the engine 130.

The print controller 200 requests the display unit 115 to display information indicating that the print job is in process (step S29). Receiving the request, the display unit 115 displays the information indicating that the print job is in process (step S30).

After the controller 110 and the engine 130 are connected, the print controller 200 refers to the foregoing print job information and checks whether a process ID is associated with the print job ID that identifies the print job of which execution is stopped in response to the notification of the reboot. If a process ID is associated, the print controller 200 determines that there is an unprocessed process. The print controller 200 then resumes the execution of the print job of which the execution is stopped in response to the notification of the reboot. In this example, the print controller 200 transmits a print start request command requesting the start of printing to the engine 130 (step S31). As a response, the print controller 200 receives a print start response command (step S32).

Suppose that the print start request acceptance result included in the print start response command received in step S32 indicates that the print start request has been accepted. In such a case, for each process ID associated with the print job ID identifying the print job of which the execution is stopped in response to the notification of the reboot, the print controller 200 transmits a process execution response command requesting the execution of the process identified by the process ID to the engine 130 (step S33). As a response, the print controller 200 receives a process execution response command from the engine 130 (step S34). For each process ID associated with the print job ID, the print controller 200 also transmits an image transfer command including the image data identified by the image ID associated with the process ID to the engine 130 (step S35). As described above, the engine 130 transmits a process state command to the print controller 200 each time the execution of the process instructed to be executed is completed (step S36).

If the transmission of the process execution request command(s) for the unprocessed process(es) ends, the print controller 200 transmits a process issuance end command to the engine 130 (step S37). The print controller 200 then transmits a print end request command to the engine 130 (step S38). As a response, the print controller 200 receives a print end response command from the engine 130 (step S39). The print controller 200 notifies the input unit 116 of the end of the print job (step S40). Receiving the notification, the input unit 116 requests the display unit 115 to display information indicating that the engine 130 is in a standby state (step S41). Receiving the request, the display unit 115 displays the information indicating that the engine 130 is in a standby state (step S42).

Figure 5:
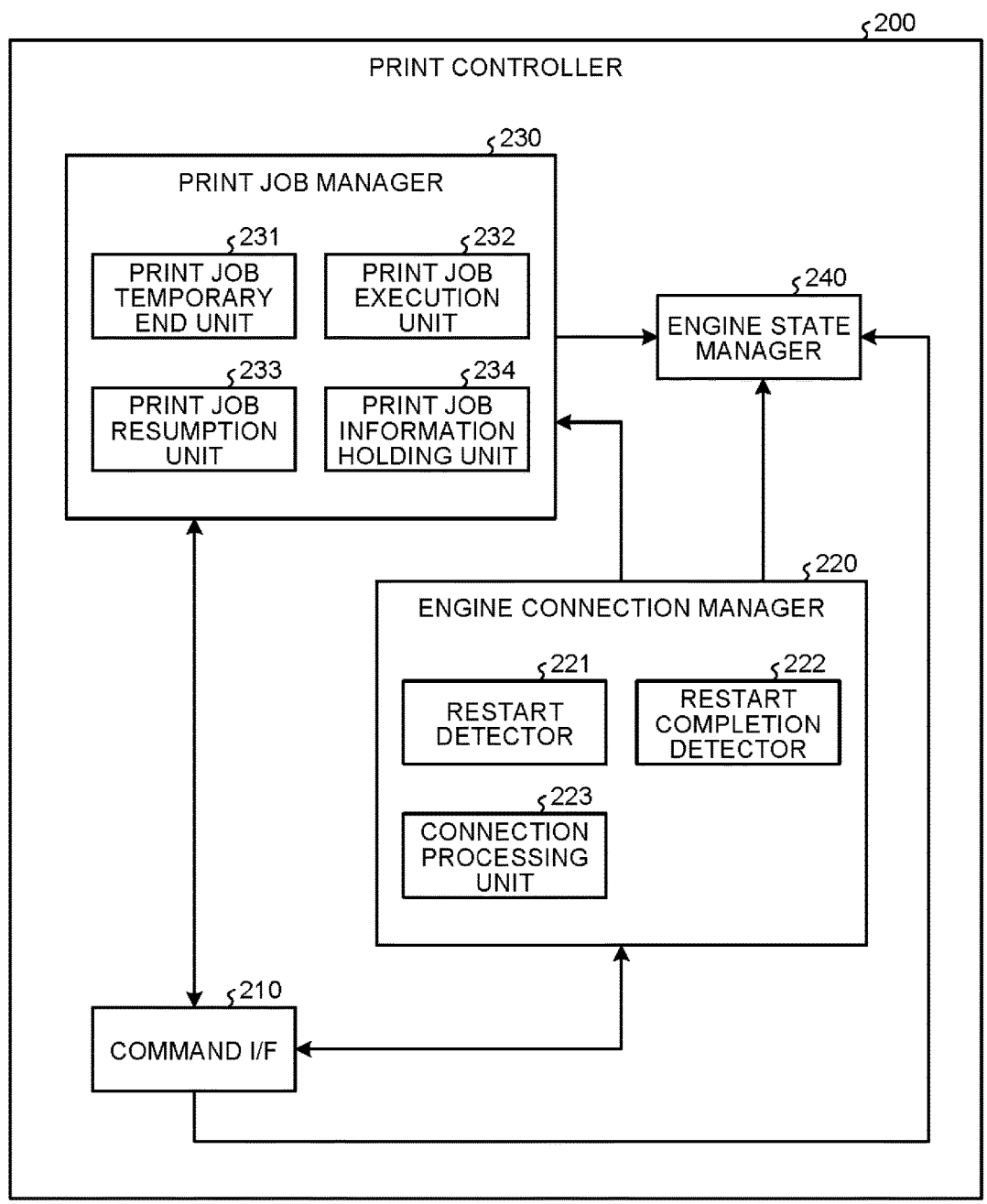
FIG. 5 is a diagram illustrating an example of functions of a print controller according to the embodiment.

Next, the functions of the print controller 200 of the controller 110 will be described with reference to FIG. 5. FIG. 5 is a diagram illustrating an example of the functions of the print controller 200. As illustrated in FIG. 5, the print controller 200 includes a command I/F 210, an engine connection manager 220, a print job manager 230, and an engine state manager 240.

The command I/F 210 transmits and receives commands to/from the engine 130.

The engine connection manager 220 is an example of first detector. The engine connection manager 220 manages the state of connection with the engine 130. As illustrated in FIG. 5, the engine connection manager 220 includes a restart detector 221, a restart completion detector 222, and a connection processing unit 223. The restart detector 221 detects a restart of the engine 130.

The restart completion detector 222 is an example of second detector. The restart completion detector 222 detects completion of the restart of the engine 130. The restart completion detector 222 transmits a ping at regular intervals as described above. If a response is received, the restart completion detector 222 detects the completion of the restart of the engine 130.

The connection processing unit 223 is an example of connection processing unit. If the completion of the restart of the engine 130 is detected by the restart completion detector 222, the connection processing unit 223 performs a process for connecting the controller 110 and the engine 130.

Next, the print job manager 230 will be described. The print job manager 230 controls execution, stop, resumption, and the like of a print job. As illustrated in FIG. 5, the print job manager 230 includes a print job temporary end unit 231, a print job execution unit 232, a print job resumption unit 233, and a print job information holding unit 234.

The print job temporary end unit 231 is an example of stop controller. If a restart of the engine 130 is detected by the restart detector 221, the print job temporary end unit 231 performs control to cause the engine 130 to stop the print job currently in process. When the print job temporary end unit 231 performs the control to cause the engine 130 to stop the print job currently in process, the print job temporary end unit 231 does not cause the display unit 115 to display information indicating completion of the print job. That is, the print job temporary end unit 231 does not request the display unit 115 to display the information indicating the completion of the print job.

The print job execution unit 232 is an example of execution controller. The print job execution unit 232 performs control to cause the engine 130 to execute a print job. As described above, for each page of image data targeted for the print job, the print job execution unit 232 performs control to request the engine 130 to execute a process corresponding to the image data, and transmit the image data.

The print job resumption unit 233 is an example of resumption controller. After the controller 110 and the engine 130 are connected by the connection processing unit 223, the print job resumption unit 233 performs control to resume the execution of the print job of which the execution is stopped by the print job temporary end unit 231 on the basis of the foregoing print job information. In the present embodiment, the print job resumption unit 233 refers to the foregoing print job information, and if a process ID is associated with the print job ID identifying the print job of which the execution is stopped by the print job temporary end unit 231, the print job resumption unit 233 performs control to resume the execution of the print job identified by the print job ID.

The print job information holding unit 234 is an example of print job information holding unit. The print job information holding unit 234 holds the foregoing print job information. Suppose that the print job information holding unit 234 receives process completion information (in this example, process state command) making a notification of the completion of execution of a process from the engine 130 as described above. The print job information holding unit 234 then updates the print job information by deleting the process ID that identifies the process notified of by the process completion information among the process IDs associated with the print job ID in the print job information.

In the present embodiment, the power supply controller 300 performs the control for supplying power to at least the print job information holding unit 234 even if a failure that needs a restart of the engine 130 occurs.

The engine state manager 240 manages the state of the engine 130 and notifies higher modules (input unit 116 and display unit 115) of the state of the engine 130.

Now, the processes in the frame marked by the symbol "K" in FIG. 3 (processes of steps S17 to S32) will be described in association with the functions of the print controller 200. The controller registration cancellation command transmitted from the engine 130 in step S17 of FIG. 3 is passed to the engine connection manager 220 via the command I/F 210. The restart detector 221 checks the cancellation type included in the controller registration cancellation command. If the cancellation type indicates "reboot," the restart detector 221 detects a restart of the engine 130, and notifies the print job manager 230 and the engine state manager 240 of the restart of the engine 130. As a response to the controller registration cancellation command, the restart detector 221 transmits a controller registration cancellation response command to the engine 130 via the command I/F 210 (corresponding to step S18 of FIG. 3).

When the print job temporary end unit 231 of the print job manager 230 is notified that the engine 130 is in process of restarting, the print job temporary end unit 231 performs control to end the print job that the print job execution unit 232 is executing. The print job temporary end unit 231 notifies the engine state manager 240 of the end of the print job. Here, the print job temporary end unit 231 does not request the display unit 115 to display information indicating the completion of the print job.

As described above, in the present embodiment, the print job temporary end unit 231 transmits a process issuance end command including the print job ID identifying the print job in process to the engine 130 via the command I/F 210 (corresponding to step S19 of FIG. 3). The print job temporary end unit 231 then transmits a print end request command including the print job ID to the engine 130 via the command I/F 210 (corresponding to step S20 of FIG. 3). The print job temporary end unit 231 subsequently receives a print end response command from the engine 130 via the command I/F 210 (corresponding to step S21 of FIG. 3).

The engine state manager 240 being notified by the restart detector 221 that the engine 130 is in process of restarting may be notified by the print job temporary end unit 231 of the end of the print job in process. In such a case, the engine state manager 240 requests the higher module (display unit 115) to display information indicating that the engine 130 is in process of restarting (corresponding to step S23 of FIG. 3). Receiving the request, the higher module displays the information indicating that the engine 130 is in process of restarting (corresponding to step S24 of FIG. 3).

The restart completion detector 222 then transmits a ping at regular intervals (corresponding to step S25 of FIG. 3). If a response to the ping is received (corresponding to step S26 of FIG. 3), the restart completion detector 222 detects that the restart of the engine 130 is completed.

When the completion of the restart of the engine 130 is detected by the restart completion detector 222, the connection processing unit 223 performs a reconnection process with the engine 130. In this example, the connection processing unit 223 transmits an engine connection request command to the engine 130 via the command I/F 210 (corresponding to step S27 of FIG. 3). As a response, the connection processing unit 223 receives an engine connection response command from the engine 130 via the command I/F 210 (corresponding to step S28 of FIG. 3). If the reconnection process with the engine 130 is completed, the connection processing unit 223 notifies the print job manager 230 and the engine state manager 240 of the completion.

Receiving the notification from the connection processing unit 223, the print job resumption unit 233 of the print job manager 230 refers to the current print job information and checks whether a process ID is associated with the print job ID identifying the print job of which the execution is stopped by the print job temporary end unit 231 (print job of which the execution is stopped in response to the notification of the reboot). The print job resumption unit 233 thereby determines whether there is an unprocessed process. If there is an unprocessed process, the print job resumption unit 233 resumes the execution of the print job of which the execution is stopped by the print job temporary end unit 231. In this example, the print job resumption unit 233 instructs the print job execution unit 232 to resume the execution of the print job of which the execution is stopped by the print job temporary end unit 231. The print job resumption unit 233 also notifies the engine state manager 240 of the resumption.

Receiving the instruction from the print job resumption unit 233, the print job execution unit 232 transmits a print start request command to the engine 130 via the command I/F 210 (corresponding to step S31 of FIG. 3). As a response, the print job resumption unit 233 receives a print start response command from the engine 130 via the command I/F 210 (corresponding to step S32 of FIG. 3). When the print start request acceptance result included in the print start response command received from the engine 130 indicates that the print start request has been accepted, the print job execution unit 232 refers to the current print job information. Then, for each process ID associated with the print job ID identifying the print job of which the execution is stopped by the print job temporary end unit 231, the print job execution unit 232 performs control to cause the engine 130 to execute the process identified by the process ID.

The engine state manager 240 being notified by the restart completion detector 222 of the completion of the reconnection process with the engine 130 may be notified by the print job resumption unit 233 of the resumption of the execution of the print job. In such a case, the engine state manager 240 requests the higher module to display information indicating that the print job is in process (corresponding to step S29 of FIG. 3). Receiving the request, the higher module displays the information indicating that the print job is in process (corresponding to step S30 of FIG. 3).

Figure 6:
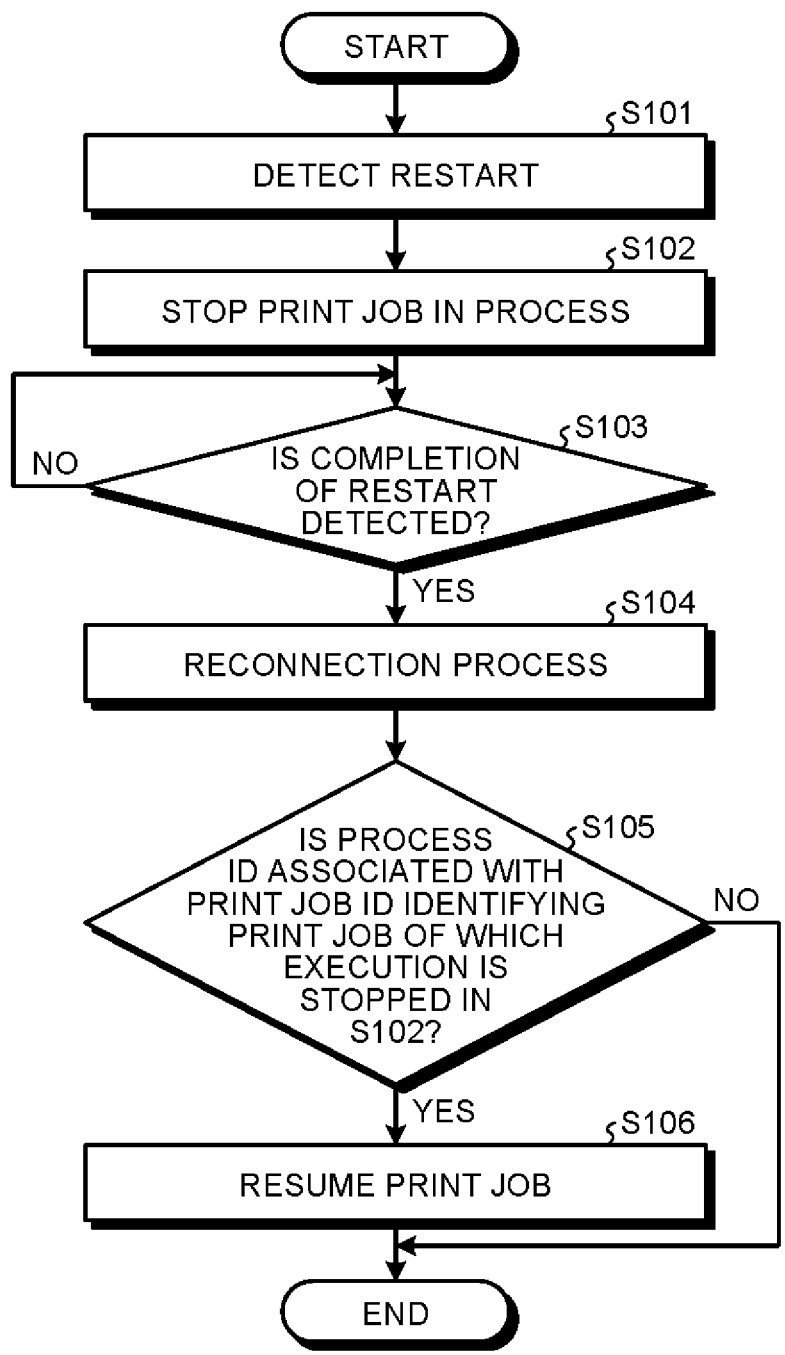
FIG. 6 is a flowchart illustrating an operation example of the print controller according to the embodiment.

FIG. 6 is a flowchart illustrating an example of an operation of the print controller 220 from the detection of a restart of the engine 130 to the resumption of the print job. As illustrated in FIG. 6, the restart detector 221 detects a restart of the engine 130 (step S101). The print job temporary end unit 231 performs control to cause the engine 130 to stop the print job currently in process (step S102). Next, if the restart completion detector 222 detects the completion of the restart of the engine 130 (step S103: Yes), the connection processing unit 223 performs a process for connecting (reconnecting) the controller 110 and the engine 130 (step S104). Next, the print job resumption unit 233 refers to the current print job information and checks whether a process ID is associated with the print job ID identifying the print job stopped in step S102 (step S105). If a process ID is associated (step S105: Yes), the print job resumption unit 233 performs control to resume the print job stopped in step S102 (step S106).

Figure 7:
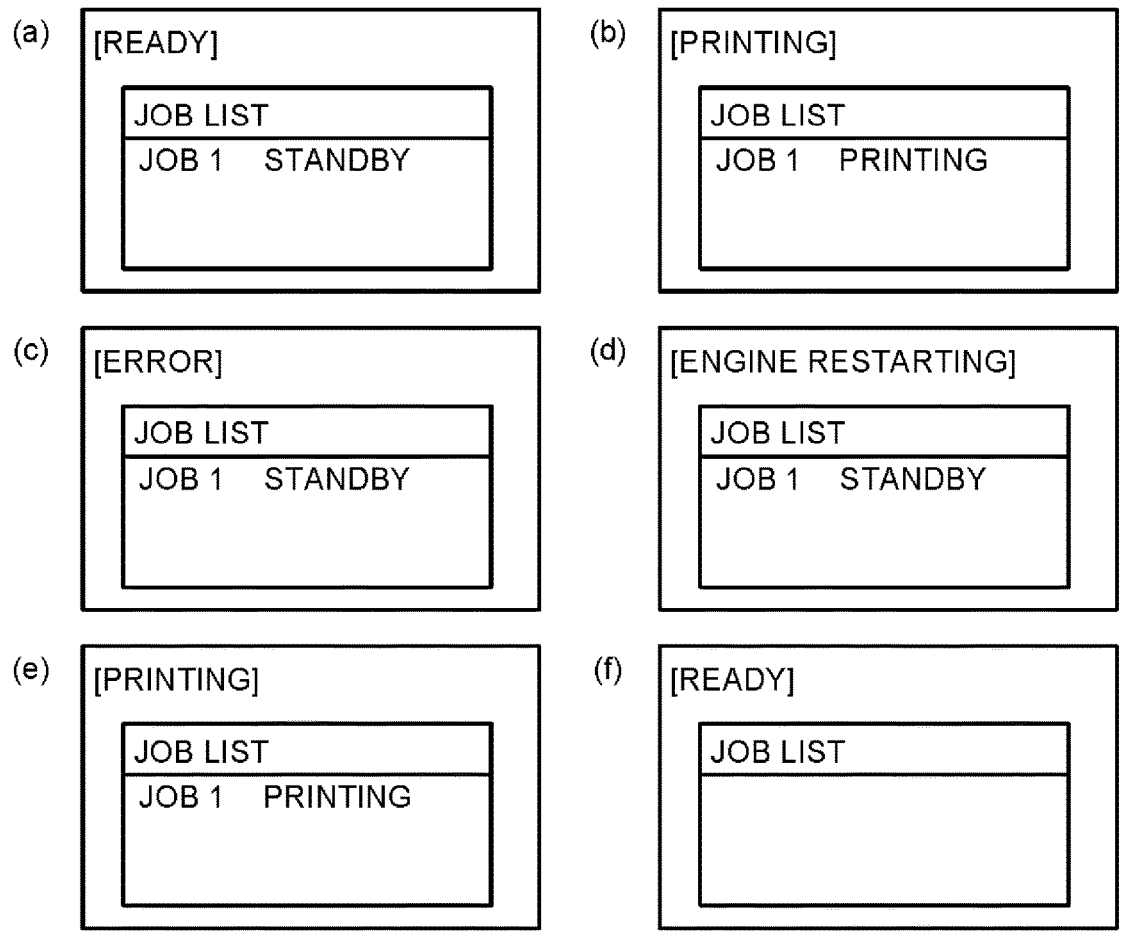
FIG. 7 is a diagram illustrating examples of screen images displayed by a display according to the embodiment.

FIG. 7 is a diagram illustrating examples of screen images displayed by the display unit 115. If the engine 130 is in a standby state (but in a state in which an execution instruction for a print job has been accepted), as illustrated in (a) of FIG. 7, the display unit 115 displays information "ready" which indicates that the engine 130 is on standby. During execution of a print job, as illustrated in (b) of FIG. 7, the display unit 115 displays information "printing" which indicates that the print job is in process. If an error notification is received from the engine 130, as illustrated in (c) of FIG. 7, the display unit 115 displays information "error" which indicates that an error has occurred. If the engine 130 is in process of restarting for the sake of recovery from a failure, as illustrated in (d) of FIG. 7, the display unit 115 displays information "engine restarting" which indicates that the engine 130 is in process of restarting (step S24 of FIG. 3). If the engine 130 has completed the restart and resumes the print job, as illustrated in (e) FIG. 7, the display unit 115 displays information "printing" which indicates that the print job is in process. If the print job ends, the engine 130 enters a standby state (but a state in which an execution instruction for a print job has not been accepted). As illustrated in (f) of FIG. 7, the display unit 115 then displays information "ready" which indicates that the engine 130 is on standby. In such a case, unlike (a) of FIG. 7, the display unit 115 does not display a list of print jobs since an execution instruction for a print job has not been accepted.

As described above, according to the present embodiment, even if a failure that needs a restart of the engine 130 occurs, control for supplying power to at least the print job information holding unit 234 (control for continuing the power supply to the controller 110) is performed. This prevents the print job information held in the controller 110 from disappearing if a failure that needs a restart of the engine 130 occurs. After a recovery from the failure, the temporary-stopped print job can thus be resumed.

The programs for the controller 110 (CPU 112) of the foregoing embodiment to execute may be configured to be provided as recorded in the form of installable or executable files on a computer-readable recording medium such as a CD-ROM, flexible disk (FD), CD-R, DVD (Digital Versatile Disk), and a USB (Universal Serial Bus) memory. The programs may be configured to be provided or distributed via a network such as the Internet. Various programs may be configured to be provided as preinstalled in a ROM or the like.

According to the present invention, even if a failure that needs reboot processing occurs, a print job having been suspended can be resumed after a recovery from the failure.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control apparatus for controlling an image forming unit that forms an image on a recording medium, the control apparatus comprising:
  an execution controller configured to perform control to cause the image forming unit to execute a print job;
  a first detector configured to detect a restart of the image forming unit;
  a stop controller configured to, when the restart of the image forming unit is detected by the first detector, perform control to cause the image forming unit to stop the print job currently in process;

a second detector configured to detect completion of the restart of the image forming unit;

the first detector further configured to, when the completion of the restart of the image forming unit is detected by the second detector, perform a process for connecting the control apparatus and the image forming unit;

a print controller configured to track a current execution location in the print job by storing an association of the print job to outstanding process identifications, receiving a notification of completion of an image forming process of one page of image data from the image forming unit along with a process identification, and deleting the process identification from the association with the print job; and a resumption controller configured to, after the control apparatus and the image forming unit are connected by the first detector, perform control to resume execution of the print job that has been stopped by the stop controller based on the current execution location.

2. The control apparatus according to claim 1, wherein for each one page of image data targeted for the print job, the execution controller performs control to request the image forming unit to execute a process corresponding to image data in the association, and to transmit the image data to the image forming unit.

3. The control apparatus according to claim 2, wherein the resumption controller refers to the current execution location, and when the process is associated with the current execution location in the print job of which the execution is stopped by the stop controller, performs control to resume the execution of the print job of which the execution is stopped by the stop controller.

4. The control apparatus according to claim 1, wherein the second detector transmits a ping at regular intervals, and when a response is received, detects the completion of the restart of the image forming unit.

5. The control apparatus according to claim 1, wherein when the stop controller performs the control to cause the image forming unit to stop the print job currently in process, the stop controller does not cause a display unit to display information indicating completion of the print job.

6. A control method performed by a control apparatus for controlling an image forming unit that forms an image on a recording medium, the control method comprising:

performing control to cause the image forming unit to execute a print job;

detecting a restart of the image forming unit;

performing, when the restart of the image forming unit is detected, control to cause the image forming unit to stop the print job currently in process;

detecting completion of the restart of the image forming unit;

performing, when the completion of the restart of the image forming unit is detected, a process for connecting the control apparatus and the image forming unit; and performing, after the control apparatus and the image forming unit are connected, control to resume execution of the print job of which the execution is stopped by the stop control step on a basis of a current execution location in the, the current execution location being tracked by: storing an association of the print job to outstanding process identifications, receiving a notification of completion of an image forming process of one page of image data from the image forming unit along with a process identification, and deleting the process identification from the association with the print job print job.

7. A computer program product comprising a non-transitory computer-readable medium including programmed instructions for causing a control apparatus, the control apparatus controlling an image forming unit that forms an image on a recording medium, to execute:

performing control to cause the image forming unit to execute a print job;

detecting a restart of the image forming unit;

performing, when the restart of the image forming unit is detected, control to cause the image forming unit to stop the print job currently in process;

detecting completion of the restart of the image forming unit;

performing, when the completion of the restart of the image forming unit is detected, a process for connecting the control apparatus and the image forming unit; and performing, after the control apparatus and the image forming unit are connected, control to resume execution of the print job of which the execution is stopped by the stop control step on a basis of a current execution location in the, the current execution location being tracked by: storing an association of the print job to outstanding process identifications, receiving a notification of completion of an image forming process of one page of image data from the image forming unit along with a process identification, and deleting the process identification from the association with the print job.

* * * * *